US009419287B2

(12) United States Patent
Chen et al.

(10) Patent No.: US 9,419,287 B2
(45) Date of Patent: Aug. 16, 2016

(54) LOW COST SYNTHESIS OF SINGLE MATERIAL BIFUNCTIONAL NONPRECIOUS CATALYST FOR ELECTROCHEMICAL DEVICES

(71) Applicants: Zhongwei Chen, Waterloo (CA); Aiping Yu, Waterloo (CA); Fathy Mohamed Hassan, Kitchener (CA)

(72) Inventors: Zhongwei Chen, Waterloo (CA); Aiping Yu, Waterloo (CA); Fathy Mohamed Hassan, Kitchener (CA)

( * ) Notice: Subject to any disclaimer, the term of this patent is extended or adjusted under 35 U.S.C. 154(b) by 0 days.

(21) Appl. No.: 14/609,966

(22) Filed: Jan. 30, 2015

(65) Prior Publication Data

US 2015/0141666 A1    May 21, 2015

Related U.S. Application Data

(63) Continuation of application No. PCT/CA2013/050593, filed on Jul. 30, 2013.

(60) Provisional application No. 61/741,869, filed on Jul. 30, 2012.

(51) Int. Cl.
| | |
|---|---|
| *B01J 27/00* | (2006.01) |
| *B01J 21/00* | (2006.01) |
| *H01M 4/96* | (2006.01) |
| *H01M 4/86* | (2006.01) |
| *C01B 31/04* | (2006.01) |
| *H01M 12/06* | (2006.01) |

(52) U.S. Cl.
CPC .............. *H01M 4/96* (2013.01); *H01M 4/8615* (2013.01); *C01B 31/043* (2013.01); *C01B 31/0438* (2013.01); *C01B 31/0484* (2013.01); *H01M 12/06* (2013.01); *Y02E 60/50* (2013.01)

(58) Field of Classification Search
CPC ........ B01J 27/00; B01J 21/00; B01J 35/0033; H01M 4/96; H01M 4/8615; C01B 31/043; C01B 31/0438; C01B 31/0484
USPC .................... 502/101, 180; 423/448; 429/400
See application file for complete search history.

(56) References Cited

U.S. PATENT DOCUMENTS

| | | | | |
|---|---|---|---|---|
| 8,709,964 B2* | 4/2014 | Ewald | ...................... | B01J 27/22 429/523 |
| 8,894,886 B1* | 11/2014 | Luhrs | .................. | C01B 31/0469 252/378 R |
| 9,040,397 B2* | 5/2015 | Maliakal | ............. | C01B 31/0446 438/492 |
| 2007/0111095 A1 | 5/2007 | Padhi et al. | | |

(Continued)

FOREIGN PATENT DOCUMENTS

| | | | | |
|---|---|---|---|---|
| CA | 2800868 A1 | 12/2011 | | |
| CN | 10-2191476 | * | 9/2011 | .............. C01B 31/02 |

(Continued)

OTHER PUBLICATIONS

Huang et al., "Graphene-based Composites", Chemical Society Review, vol. 41, No. 2, Jan. 21, 2012, pp. 666-686.

(Continued)

*Primary Examiner* — Patricia L Hailey
(74) *Attorney, Agent, or Firm* — Santosh K. Chari; Blake, Cassels & Graydon LLP

(57) ABSTRACT

A bifunctional catalyst for catalyzing both an oxygen reduction reaction and an oxygen evolution reaction is provided, wherein the catalyst comprises a doped graphene backbone having thiol functional groups. A method for producing a bifunctional catalyst is also provided.

18 Claims, 7 Drawing Sheets

(56) References Cited

U.S. PATENT DOCUMENTS

| | | |
|---|---|---|
| 2007/0166602 A1 | 7/2007 | Burchardt |
| 2009/0311604 A1 | 12/2009 | Nazar et al. |
| 2012/0058350 A1* | 3/2012 | Long .................... B82Y 10/00 428/446 |
| 2012/0088154 A1 | 4/2012 | Liu et al. |
| 2012/0115046 A2 | 5/2012 | Mak et al. |
| 2012/0116094 A1* | 5/2012 | Swager ............... C01B 31/0213 548/256 |
| 2012/0140378 A1* | 6/2012 | Tan ...................... H01G 11/02 361/500 |
| 2012/0145234 A1* | 6/2012 | Roy-Mayhew ...... H01G 9/2022 136/256 |
| 2012/0214068 A1* | 8/2012 | Dai ...................... H01G 11/36 429/224 |
| 2013/0119321 A1* | 5/2013 | Lettow .................... H01B 1/08 252/510 |
| 2013/0171339 A1* | 7/2013 | Wang ...................... H01M 4/38 427/113 |
| 2014/0023939 A1* | 1/2014 | Chen ................... H01M 4/9016 429/405 |
| 2014/0209480 A1* | 7/2014 | Cheng .................. H01G 11/28 205/759 |
| 2014/0353144 A1* | 12/2014 | Nakanishi ............... C25B 11/03 204/252 |

FOREIGN PATENT DOCUMENTS

| | | | | |
|---|---|---|---|---|
| CN | 10-2544521 | * | 7/2012 | ............ H01M 12/06 |
| CN | 10-4795565 | * | 7/2015 | ............. H01G 11/42 |
| WO | 2011/150325 | * | 12/2011 | ............. B01J 21/18 |
| WO | WO2012/100354 A1 | | 12/2011 | |
| WO | 2012/114108 | * | 8/2012 | ............. H01M 4/86 |

OTHER PUBLICATIONS

Jonssen, Ludwig, "Bifunctional Oxygen/Air Electrodes", Journal of Power Sources, vol. 155, Dec. 2005, pp. 23-32.

Lu et al., "Platnum-Gold Nanoparticles a Highly Active Bifunctional Electrocatalyst for Rechargeable Lithium-Air Batteries", J. AM. Chem. Soc. Communications, vol. 132, Apr. 2010, pp. 12170-12171.

Yang et al., "Sulfur-Doped Graphene as an Efficient Metal-free Cathode Catalyst for Oxygen Reduction", ACS Nano, vol. 6, No. 1, 2012, pp. 205-211.

International Search Report issued Nov. 19, 2013 on PCT/CA2013/050593.

* cited by examiner

LOW COST SYNTHESIS OF SINGLE MATERIAL BIFUNCTIONAL NONPRECIOUS CATALYST FOR ELECTROCHEMICAL DEVICES

CROSS REFERENCE TO PRIOR APPLICATIONS

This application is a Continuation of PCT Patent Application Number PCT/CA2013/050593, filed Jul. 30, 2013, which claims priority under the Paris Convention to U.S. Application No. 61/741,869, filed Jul. 30, 2012. The entire contents of the aforementioned applications are incorporated herein by reference.

FIELD OF THE INVENTION

The present invention relates to a catalyst for use in electrochemical devices. In particular, the invention relates to a bifunctional catalyst and a method for producing the same.

BACKGROUND OF THE INVENTION

Electrochemical devices, such as metal-air batteries or metal-air fuel cells, are very promising energy conversion technologies that provide alternatives to the use of fossil fuels. As is known in the art, typical metal-air batteries and fuel cells comprise anodes that are formed using metals such as zinc (Zn), aluminum (Al) and lithium (Li). During the discharge of such batteries and fuel cells, oxidation of the metal occurs at the anode, which releases electrons which are transported via an external circuit to a cathode. At the cathode, an oxygen reduction reaction occurs, converting oxygen from air and water from an electrolyte into hydroxide ions. In zinc-air batteries in particular, hydroxide ions then migrate through the electrolyte to reach the anode where they form a metal salt (e.g. zincate), which decays into a metal oxide (e.g. zinc oxide). As such, the metallic anode gradually becomes depleted over time in a primary metal-air battery or fuel cell, thus requiring a continuous supply of metal for long term operation. However, the depletion of the anode can be mitigated by introducing oxygen evolution reaction at the cathode while the battery or the fuel cell is not being discharged, as this result in the oxygen reduction reaction to occur at the anode, which in turn causes metal to be regenerated at the anode. However, the oxygen reduction reaction (ORR) and the oxygen evolution reaction (OER) have large overpotentials and sluggish reaction kinetics. Therefore, to realize large scale application of metal air battery/fuel cells, improved catalysts are required.

Various approaches have been proposed to address the abovementioned deficiencies, such as through the use of bifunctional catalysts. Bifunctional catalysts are generally catalysts that catalyze both oxygen reduction and oxygen evolution reactions. For example, Jörissen (Ludwig Jörissen (2006); "Bifunctional oxygen/air electrodes"; *Journal of Power Sources* 155 (1): 23-32) reviewed many bifunctional catalysts, which catalyze both ORR and OER, made with various materials such as perovskite, spinel and pyrochlore type mixed metal oxides. However, Jörissen indicates that additional research is still needed in the field of bifunctional catalysts. In another example, Lu et al. (Yi-Chun Lu et al. (2010); "Platinum-Gold Nanoparticles: A Highly Active Bifunctional Electrocatalyst for Rechargeable Lithium-Air Batteries"; *Journal of American Chemical Society*, 132 (35): 12170-12171) describe a bifunctional catalyst based on platinum and gold; however, the high cost of the catalyst discourages its large scale implementation.

U.S. Publication No. 2007/0166602 to Burchardt describes combining an oxygen reduction catalyst and various oxides (e.g. $CoWO_4$, $La_2O_3$) to obtain high bifunctional activity. U.S. Publication No. 2007/0111095 to Padhi et al. describes using manganese oxide contained in an octahedral molecular sieve as a catalyst for metal-air cathodes.

Other approaches are also known which generally involve selecting one catalyst for catalyzing the oxygen reduction reaction and another for catalyzing the oxygen evolution reaction and combining the two catalysts together to effectively obtain a catalytic material that catalyzes both reactions. However, these approaches add complications to electrode fabrication and increase the cost of production. Furthermore, in most of these approaches, the catalyst is either an expensive precious metal like platinum (Pt) or gold (Au), or a mixture, composite or spinel of oxides containing other expensive materials such as lanthanum oxide ($La_2O_3$).

A further example of a catalyst is provided in Applicant's co-pending PCT application number PCT/CA2012/050050, filed Jan. 27, 2012, the entire contents of which are incorporated herein by reference.

Graphene is a material that is known to have unique properties such as high chemical resistance and high electrical conductivity, among others. More importantly, graphene is generally prepared from graphite, which is inexpensive and abundant. It is well known in the art to dope graphene with other elements to increase its activity for use as a catalyst. Several researches have explored the effects of doping graphene with elements such as nitrogen and boron for various applications. Although the effects of doping graphene with sulfur has been studied by Yang et al., (Zhi Yang et al. (2012); "Sulfur-Doped Graphene as an Efficient Metal-free Cathode Catalyst for Oxygen Reduction"; *ACS Nano* 6 (1): 205-211) only its effects on oxygen reduction reactions (ORRs) were studied. Furthermore, the sample preparation method used by Yang et al. involved reacting aromatic compounds containing sulfur at high temperatures, thus giving rise to a relatively high cost of production as well as potential health and/or environment issues.

The prior art also describes the beneficial effects of mixing carbon materials with sulfur for electrochemical energy applications. For example, U.S. Publication Number 2009/0311604 to Stamm et al. describes mixing carbon material with sulfur to prepare the electrodes for a lithium-sulfur battery. In another example, in U.S. Publication Number 2012/0088154 to Liu et al., graphene-sulfur nanocomposites were used as an electrode material for a rechargeable lithium sulfur battery.

Despite the various proposed approaches as discussed above, there remains a need for a catalyst material that addresses at least one of the deficiencies known in the art. For example, there exists a need for cost effective catalysts that: (i) possess improved activity, (ii) possess improved stability, and/or (iii) do not contain expensive materials such as precious metals. Furthermore, there exists a need for a method of producing catalysts in a cost effective manner and which does not harm the environment.

SUMMARY OF THE INVENTION

In one aspect, the present invention provides a bifunctional catalyst for catalyzing both an oxygen reduction reaction and an oxygen evolution reaction, the catalyst comprising a doped graphene backbone having thiol functional groups.

In another aspect, the present invention provides a method for producing a bifunctional catalyst for catalyzing both an oxygen reduction reaction and an oxygen evolution reaction, the method comprising mixing graphitic oxide with a source of sulfur, and heating the mixture to form graphene, wherein the graphene is doped with sulfur and wherein graphene is provided with thiol functional groups.

BRIEF DESCRIPTION OF THE DRAWINGS

The features of the invention will become more apparent in the following detailed description in which reference is made to the appended drawings wherein.

DETAILED DESCRIPTION OF THE INVENTION

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

Generally, according to one aspect, the present invention provides a metal-free bifunctional catalyst inspired from structures of biological molecules (e.g. proteins with thiol groups). According to one embodiment, a bifunctional catalyst for catalyzing both an oxygen reduction reaction, during the discharging phase of a electrochemical device, such as a metal-air fuel cell or battery, and an oxygen evolution reaction, during the charging phase, is provided wherein the bifunctional catalyst comprises a doped graphene backbone having thiol functional groups.

Figure 1:
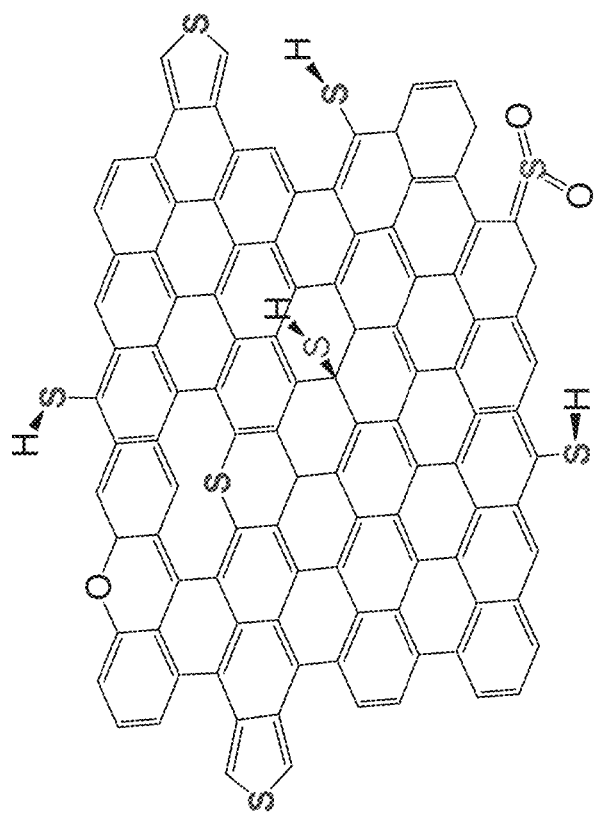
FIG. 1 is the chemical structure of a thiol functionalized sulfur doped graphene (TFSG) according to one embodiment.

The bifunctional catalyst according to one embodiment is shown in FIG. 1. As shown in FIG. 1, thiol groups (—SH), are chemically bonded to carbon atoms of the doped graphene backbone. In one embodiment, graphene is doped with heteroatoms, such as sulfur, nitrogen, oxygen, phosphorous or boron. In one embodiment of the invention, graphene is doped with sulfur. In one embodiment, sulfur dioxide functional groups (—$SO_2$) are also attached to the doped graphene backbone as shown in FIG. 1. Furthermore, in the embodiment shown in FIG. 1, graphene is shown as being doped with both sulfur and oxygen.

According to another aspect, the present invention provides a method for producing a bifunctional catalyst which catalyzes both an oxygen reduction reaction and an oxygen evolution reaction, the method comprising mixing graphitic oxide with a source of sulfur and heating the mixture to form graphene, wherein graphene is doped with sulfur and wherein graphene is provided with thiol functional groups.

Figure 2:
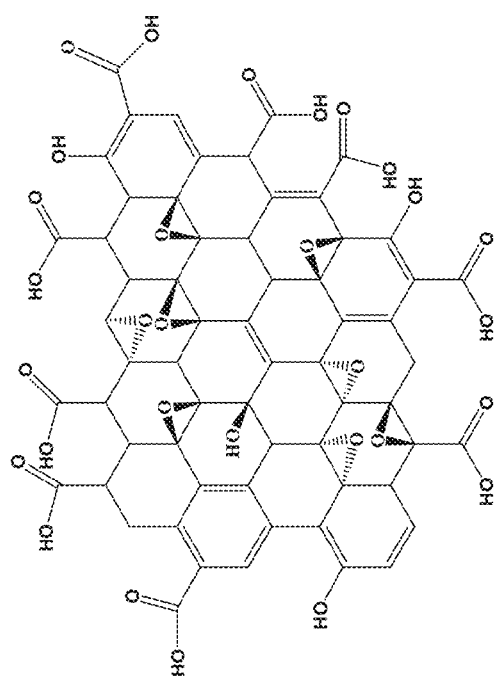
FIG. 2 is the chemical structure of a graphitic oxide (GO) according to one embodiment.

In one embodiment, sodium thiosulfate ($Na_2S_2O_3$) is used as the source of sulfur. The reaction in one embodiment is generally performed by first mixing graphitic oxide (GO) with sodium thiosulfate. The mixture of GO and sodium thiosulfate is then heated to form graphene, wherein graphene is doped with sulfur and graphene is provided with thiol functional groups. As an example, the chemical structure of GO is shown in FIG. 2. In one embodiment, GO and sodium thiosulfate are mixed in water. The bifunctional catalyst produced according to one embodiment of the method is shown as an example in FIG. 1.

In another embodiment, thiourea ($CH_4N_2S$) is used as the source of sulfur. The reaction in one embodiment is generally performed by first mixing graphitic oxide (GO) with thiourea. The mixture of GO and thiourea is then heated to form graphene, wherein graphene is doped with sulfur and graphene is provided with thiol functional groups. In one embodiment, graphene is further doped with nitrogen from thiourea.

In one embodiment, graphitic oxide (GO) is first prepared by oxidizing graphene using oxidation methods which are well known in the art, such as, for example, modified Hummer's method. An example of a graphitic oxide produced by this method is shown in FIG. 2.

In one embodiment of the invention, the bifunctional catalyst produced according to a method is further doped with nitrogen, oxygen, phosphorous or boron. As will be appreciated by the persons skilled in the art, graphene may be doped with the above heteroatoms by choosing an appropriate source of sulfur.

In one embodiment, the bifunctional catalyst according to the present invention is used as a cathode for use in an electrochemical device to catalyze both oxygen reduction and oxygen evolution reactions. For example, the cathode may be used in metal-air batteries and fuel cells.

The performance of the bifunctional catalyst according to one embodiment of the present invention was tested using cyclic voltammetry (CV) and by incorporating a cathode comprising the bifunctional catalyst into a prototype metal-air fuel cell as will be described below. It was also shown through testing that the thiol functional group attached to the doped graphene backbone was found to create active sites on the surface of the catalyst material that catalyze both oxygen reduction and oxygen evolution reactions. In one embodiment of the invention, the bifunctional catalyst is be used as a cathode without further treatment or processing steps (i.e. as-prepared).

The bifunctional catalyst according to one embodiment is a metal-free, non-precious (i.e. does not contain any precious metals) catalyst for catalyzing both ORR and OER. In one embodiment, the catalyst is a thiol functionalized sulfur doped graphene (TFSG). In comparison to other commercially-available ORR catalysts such as carbon supported platinum nanoparticles (Pt/C), the bifunctional TFSG catalyst according to one embodiment of the invention was found to have a comparable ORR activity and higher OER activity. The bifunctional TFSG catalyst was also found to be relatively durable in comparison to Pt/C, since the bifunctional TFSG retained a majority of its catalytic properties even after a number charge and discharge cycles. These findings were supported by series of tests (e.g. microscopy, spectroscopy and cyclic voltammetry) conducted on a TFSG sample produced according to one embodiment as will be described.

SUMMARY OF FEATURES

Thus, as would be understood from the present specification, the present invention, in one aspect, provides a one-step hydrothermal synthesis of a metal-free bifunctional catalyst. In one aspect, the metal-free bifunctional catalyst is a single material, meaning that both oxygen evolution and reduction reactions are catalyzed by the same material, as opposed to other approaches known in the art where different OER and ORR catalysts are mixed or coupled to one another to produce a composite and/or hybrid bifunctional catalyst.

In a further aspect, these functional groups were also found to have changed the ORR reaction mechanism to the more efficient 4 electron pathway, wherein hydroxide ions are produced, as opposed to the less efficient 2 electron pathway wherein hydrogen peroxide is produced as a by-product.

EXAMPLES

Aspects of the invention will now be illustrated with reference to the following examples; however, it will be understood that the scope of the invention is not to be limited by the following examples.

Example 1

Figures 3, 4:
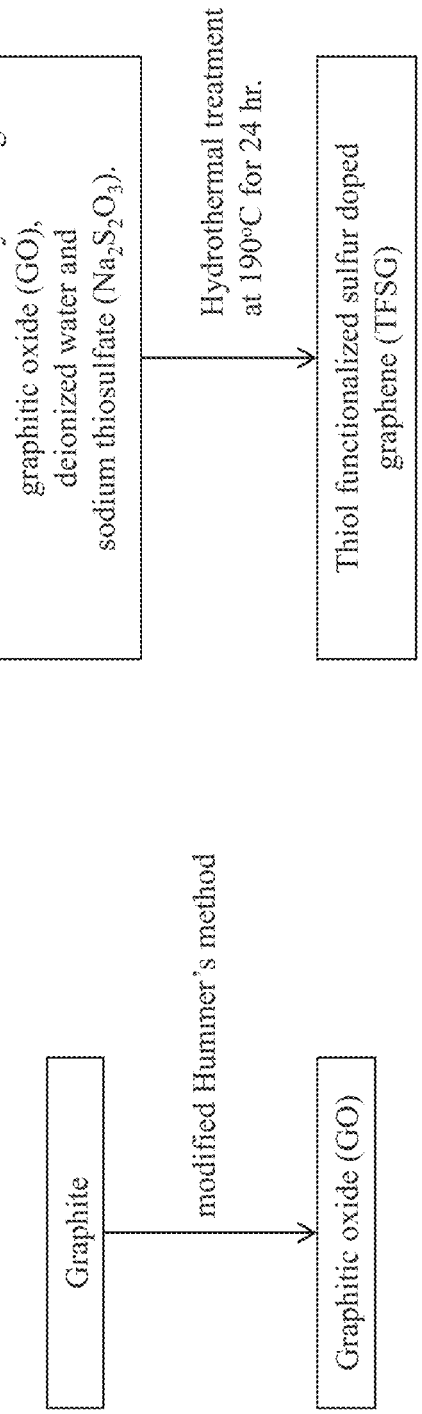
FIG. 3 is a flowchart showing the conversion of graphite into graphitic oxide (GO) according to one embodiment.
FIG. 4 is a flowchart showing the conversion of graphitic oxide into thiol functionalized sulfur doped graphene (TFSG) according to one embodiment.
Figure 5:
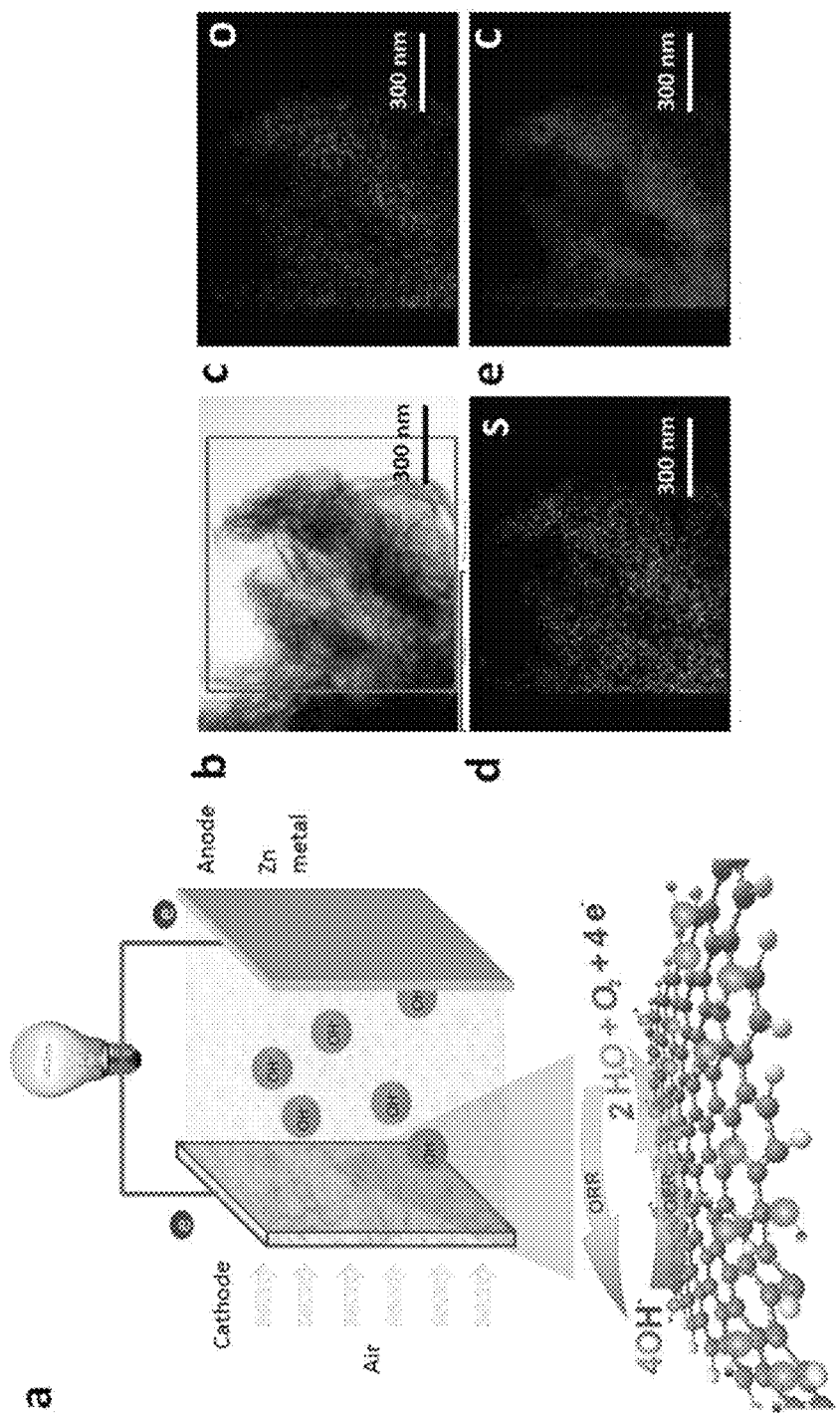
FIG. 5 shows: a) a basic schematic diagram of a zinc-air fuel cell; b) a SEM image of the TFSG; c) an image of an elemental mapping for oxygen of a selected portion of the sample as shown in b); d) an image of an elemental mapping for sulfur of the selected portion of the sample; and e) an image of an elemental mapping for carbon of the selected portion of the sample.
Figure 6:
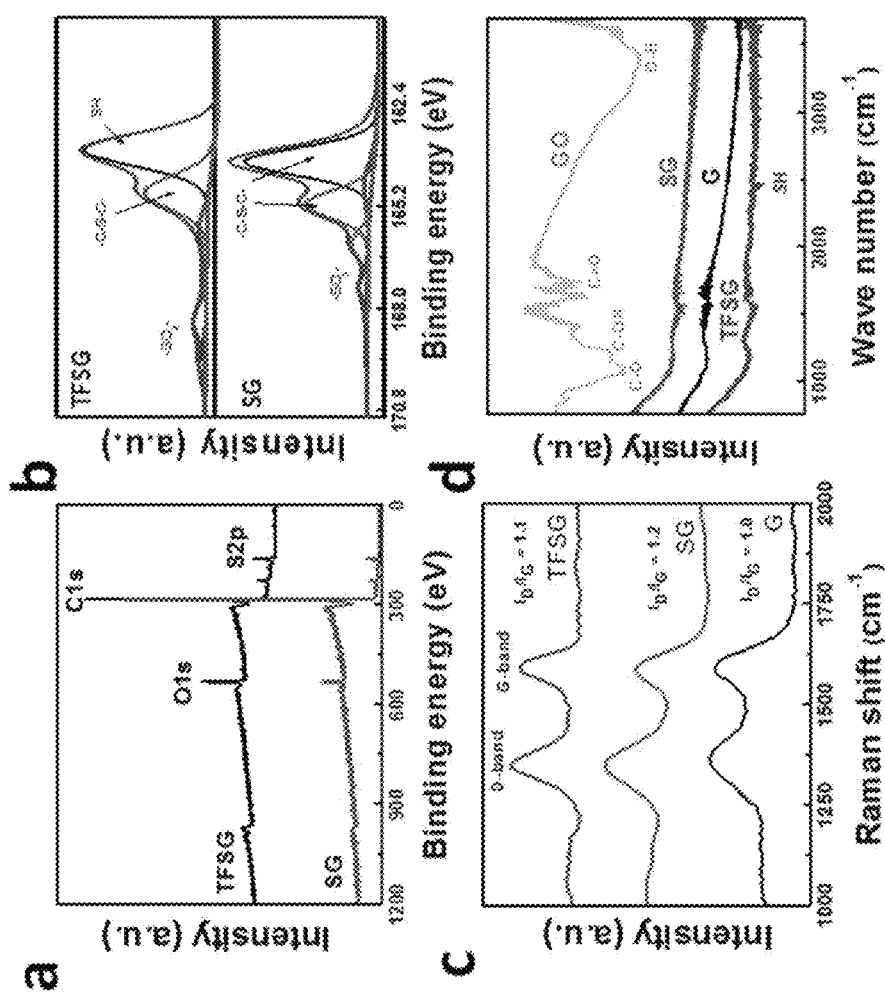
FIG. 6 shows: a) a spectrum obtained for TFSG using an x-ray photoelectron spectrometer (XPS); b) a spectrum obtained for TFSG using an x-ray photoelectron spectrometer (XPS); c) a spectrum obtained for TFSG using raman spectroscopy; and d) a spectrum obtained for TFSG using FTIR.

In this example, graphitic oxide (GO) was initially prepared by using a modified Hummer's method, in which graphite is oxidized to produce graphitic oxide as shown in FIG. 3. GO was produced, in this example, by exposing graphite to a mixture of sulfuric acid, sodium nitrate and potassium permanganate. Then, as shown in a diagram in FIG. 4, 100 mg of graphitic oxide was dispersed in approximately 35 mL of de-ionized water (DI) and an aqueous solution of sodium thiosulfate ($Na_2S_2O_3$, 200 mg) was added to form a reaction mixture. The reaction mixture was then transferred into a Teflon lined autoclave and was subjected to a hydrothermal treatment at a temperature of 190° C. for 24 hours. The mixture was then filtered to obtain a thiol functionalized sulfur doped graphene (TFSG). TFSG was then washed several times with deionized water and ethanol before being dried in a vacuum oven at a temperature of 100° C. The structure and morphology of TFSG was analyzed by conducting sample analysis using transmission electron microscopy (TEM), x-ray photoelectron spectroscopy (XPS), Raman spectroscopy and Fourier transform infrared spectroscopy (FTIR). In particular, the presence of the thiol functional groups in the sample was confirmed using the above techniques. The results of these analyses are shown in FIGS. 5 and 6. In particular, an SEM image of the TFSG is shown in FIG. 5b, while the elemental mapping of elements O, S and C from a selected area of the image in FIG. 5b are shown in FIGS. 5c, 5d and 5e, respectively. The results from XPS, Raman spectroscopy, and FTIR are shown in FIGS. 6a and 6b, 6c, and 6d, respectively. For comparison purposes, a sample of sulfur doped graphene (SG) was prepared using a high temperature pyrolysis of graphene oxide and diphenyl sulfide and tested.

Example 2

The electrocatalytic activity and stability of various catalyst samples, namely the TFSG, sulfur doped graphene (SG), and Pt/C were each measured using rotating disc electrode (RDE) voltammetry. Each catalyst was coated onto a glassy carbon working electrode, which was then immersed in a glass cell containing an electrolyte (0.1 M KOH). A reference electrode (a double junction saturated calomel electrode (SCE)) and counter electrode (a platinum wire) were also both immersed in the electrolyte.

Figure 7:
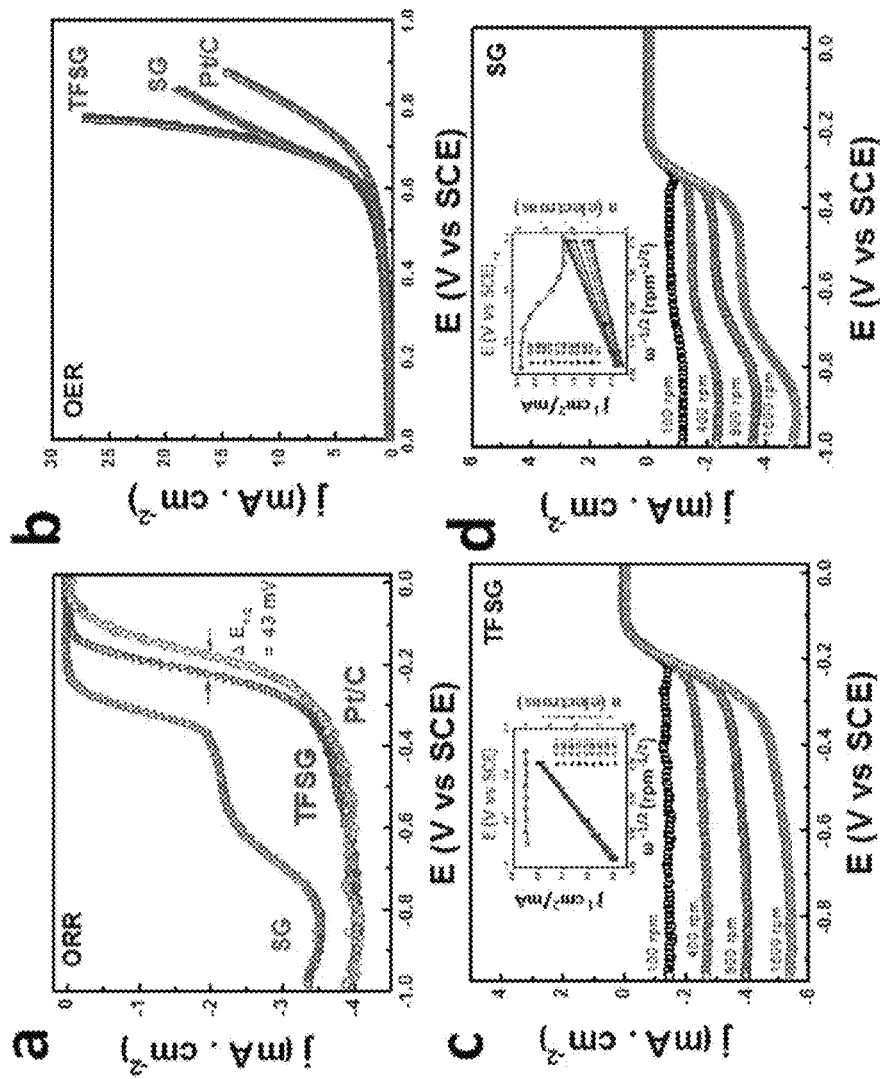
FIG. 7 shows: a) a plot showing ORR responses obtained from sulfur doped graphene (SG), TFSG and Pt/C in a linear sweep voltammetry test; b) a plot showing OER responses obtained from SG, TFSG and Pt/C in a cyclic voltammetry (CV) test; c) a plot showing the ORR responses obtained from TFSG at different rotation speeds; and d) a plot showing the ORR responses obtained from SG at different rotation speeds.

Tests for comparing the oxygen reduction reaction (ORR) activity of the TFSG to those of SG and Pt/C were conducted using linear sweep voltammetry at a scan rate of 10 mV/s between 0.1 V to −1 V (vs. SCE) in $O_2$ saturated 0.1 M KOH at 900 rpm. The test results are shown in FIG. 7a. In particular, it can be seen from the test results that the TFSG catalyst exhibits a higher ORR activity than SG and a comparable ORR activity to the state-of-art ORR catalyst (i.e. a commercially available Pt/C catalyst). More specifically, the half-wave potential of TFSG was measured to be only 43 mV lower than that of Pt/C. Additional ORR tests were also performed at different rotation speeds, namely 100 rpm, 400 rpm, 900 rpm and 1600 rpm, to observe the effects of electrode rotation on the kinetics of the reactions for the TFSG catalyst and SG. These test results are shown in FIGS. 7c and 7d, respectively.

For comparing the oxygen evolution reaction (OER) activity of the samples, 40 cycles of cyclic voltammetry (CV) measurements were taken at a potential scan rate of 50 mV/s over a potential window of 0 to 1 V using rotating disk electrode with a rotation speed of 900 rpm. The test was conducted in a nitrogen saturated 0.1 M KOH solution. In this example, measurements taken over 40 cycles were found to be sufficient for comparing the OER activity of a commercial Pt/C catalyst to that of the TFSG catalyst. The CV test results taken at the $5^{th}$ cycle for each sample are shown in FIG. 7b. In particular, it was observed during testing that the Pt/C catalyst degraded rapidly, whereas the TFSG catalyst retained a majority of its OER activity. As it can be seen from the above test results, the TFSG catalyst displayed the highest OER activity out of all the samples which were tested.

In this example, a kinetic analysis was conducted on a TFSG sample to show that the presence of the thiol group changes the reaction mechanism to a more efficient 4 electron pathway. As such, it was found that the presence of the thiol groups in the TFSG catalyst contributed to the high performance of TFSG in catalyzing both ORR and OER as observed in the tests above.

Figure 8:
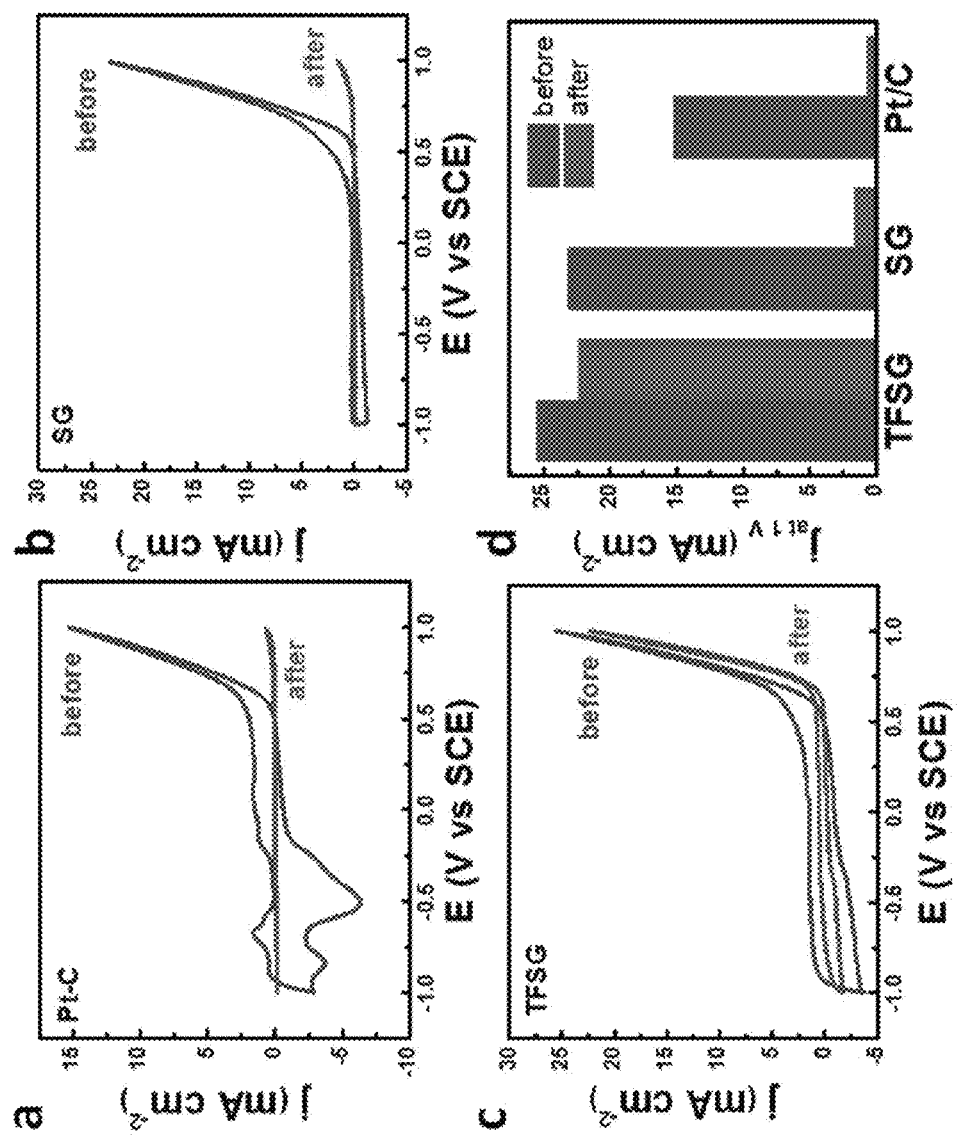
FIG. 8 shows: a) a plot showing the responses obtained from a Pt/C catalyst on the first cycle ("before") and the $200^{th}$ cycle ("after") of a full range degradation test (FDT); b) a plot showing the responses obtained from SG on the first cycle ("before") and the $200^{th}$ cycle ("after") of a FDT; c) a plot showing the responses obtained from the TFSG on the first cycle ("before") and the $200^{th}$ cycle ("after") of a FDT; and d) a graph showing the maximum current densities obtained in each FDT test.

In order to compare the durability of the TFSG catalyst against other samples, each electrode coated with the sample was subjected to a highly aggressive condition in a test called the full range durability test (FDT). The tests were conducted by using the CV test set up with the rotating disk electrode at a rotation speed of 900 rpm. The potential range was selected such that the range covers both oxygen reduction and evolution reactions (i.e. from −1 V to +1 V (vs SCE)). The tests were performed in a nitrogen saturated 0.1 M KOH at a scan rate of 50 mV/s. The test results showing the response from the first cycle (labelled "before") and the $200^{th}$ cycle (labelled "after") for each of Pt/C, SG and TFSG are shown in FIGS. 8a, 8b and 8c, respectively. FIG. 8d shows a bar graph that compares the current densities (j) obtained at 1V "before" and "after" for each sample. As can be seen from the above FDT results, the TFSG catalyst's maximum current density decreased to approximately 86% of its "before" value after 200 cycles, while that of the Pt/C catalyst decreased to approximately 10% of its "before" value. Accordingly, it was shown through the tests that the TFSG catalyst is highly durable as a bifunctional catalyst in comparison to the Pt/C catalyst.

Example 3

Figure 9:
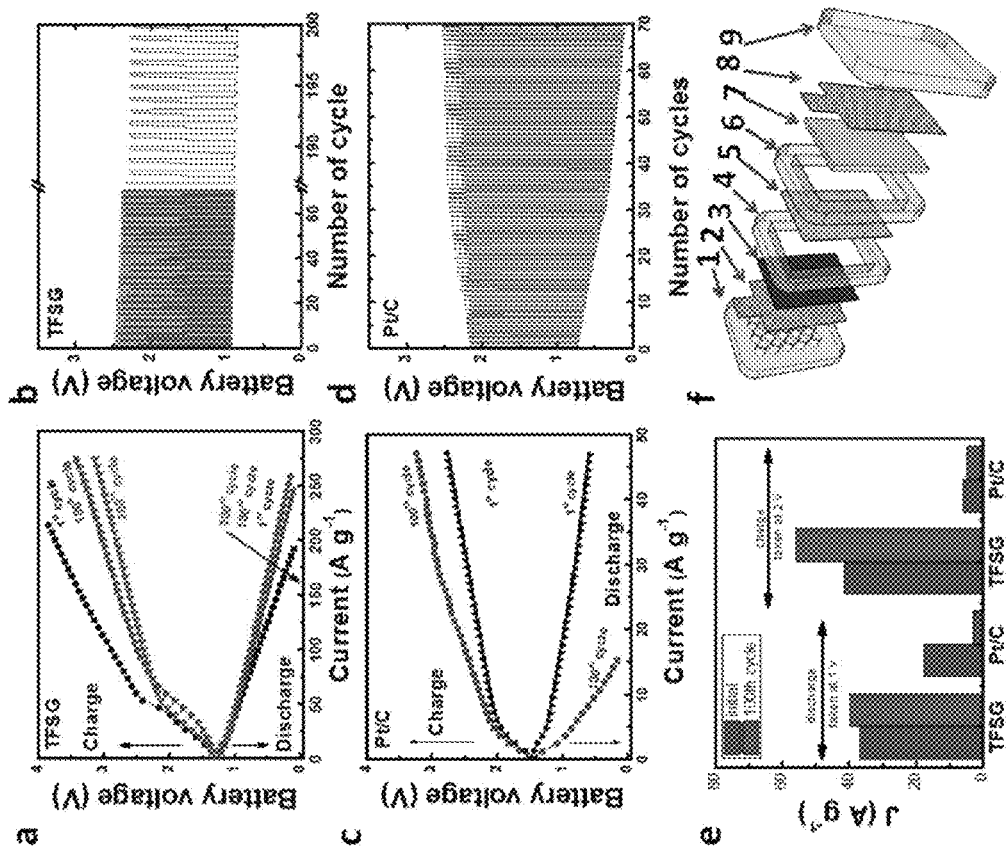
FIG. 9 shows: a) a plot showing the discharge and charge profiles obtained from a prototype zinc-air fuel cell incorporating the TFSG catalyst at different cycles; b) a plot showing the charge and discharge voltages obtained from a prototype zinc-air fuel cell incorporating the TFSG catalyst over 200 cycles; c) a plot showing the discharge and charge profiles obtained from a prototype zinc-air fuel cell incorporating the Pt/C catalyst at different cycles; d) a plot showing the charge and discharge voltages obtained from a prototype zinc-air fuel cell incorporating the Pt/C catalyst over 70 cycles; e) a plot comparing the maximum current obtained for each fuel cell at different voltages; and f) a schematic diagram of a prototype fuel cell.

The performance of the TFSG as an air electrode (i.e. cathode) was evaluated by incorporating it into a prototype zinc-air battery. A polished zinc plate and a TFSG coated gas diffusion layer (Ion Power Inc., SGL Carbon 10 BB, 2.5 cm by 2.5 cm) were used as an anode and a cathode, respectively. The TFSG catalyst loading on the gas diffusion layer was approximately 0.5 mg catalyst/$cm^2$ and the electrolyte used in the zinc-air battery was 6 M KOH. Battery discharge and charge tests at various currents were performed, along with repeated charge-discharge cycle tests using a constant current. In particular, discharge and charge profiles of the TFSG battery at different cycles (namely $1^{st}$, $100^{th}$ and $200^{th}$ cycles) are shown in FIG. 9a, and changes in the battery charge and discharge voltages over 200 charge and discharge cycles at 18 mA $cm^{-2}$ are shown in FIG. 9b. For comparison purposes, a similar device to the one described above was constructed by incorporating a commercially available Pt/C catalyst in the cathode instead. The device was tested using identical test parameters to produce the discharge and charge profiles shown in FIG. 9c and a plot of the battery charge and discharge voltages over 70 cycles as shown in FIG. 9d. FIG. 9e shows a bar graph of the current for the initial cycle and the $100^{th}$ cycle for each device taken at 1V and at 2V. As shown through these test results, the device incorporating the TFSG catalyst maintained a relatively low overpotential in comparison to the Pt/C device, thus displaying an increased performance. The difference in performance between the two catalysts is particularly evident when the current at various cycles is compared as in FIG. 9e.

FIG. 9f shows a schematic diagram of a prototype zinc-air fuel cell. In one embodiment, the zinc-air fuel cell includes a Perspex (PMMA) sheet 1 with holes extending therethrough for air access, a pair of stainless steel current collectors 2 and 8, a catalyst loaded gas diffusion layer 3 that acts as the cathode, two separators 4 and 6 which forms an electrolyte chamber for containing the electrolyte (6M KOH), a membrane (e.g. a Celgard 5550 membrane), a polished zinc (Zn) plate 8 that acts as the anode and a Perspex (PMMA) sheet 9.

In an aspect, the cathode is prepared by first formulating a TFSG catalyst ink by ultrasonically dispersing the TFSG catalyst and Nafion® in isopropanol, and then spraying the TFSG catalyst ink on the side of the gas diffusion layer that faces the electrolyte.

By way of example, a schematic diagram illustrating the OER and ORR in a zinc-air fuel cell according to one embodiment is shown in FIG. 5a.

Example 4

In this example, graphitic oxide (GO) was initially prepared by using a modified Hummer's method as described above. Then, graphitic oxide was dispersed in de-ionized water (DI) and thiourea ($CH_4N_2S$) was added to form a reaction mixture. The reaction mixture was then transferred into a Teflon lined autoclave and was subjected to a hydrothermal treatment at a temperature of 120° C. for 6 hours then 190° C. for 18 hours. The mixture was then filtered to obtain a thiol functionalized sulfur and nitrogen doped graphene (TFSNG). TFSNG was then washed several times with deionized water and ethanol before being dried in a vacuum oven at a temperature of 100° C. The structure and morphology of TFSNG was analyzed by conducting sample analysis using transmission electron microscopy (TEM), x-ray photoelectron spectroscopy (XPS), Raman spectroscopy and Fourier transform infrared spectroscopy (FTIR). In particular, the presences of the thiol functional groups as well as the sulfur and nitrogen dopants in the sample were confirmed using the above techniques. Furthermore, the sample was used as an electrode in a prototype fuel cell as described above to test its performance.

Although the invention has been described with reference to certain specific embodiments, various modifications thereof will be apparent to those skilled in the art. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

We claim:

1. A bifunctional catalyst for catalyzing both an oxygen reduction reaction and an oxygen evolution reaction, wherein the catalyst is an electrocatalyst comprising a doped graphene backbone having thiol functional groups.

2. The bifunctional catalyst according to claim 1, wherein the graphene is doped with heteroatoms.

3. The bifunctional catalyst according to claim 1, wherein the graphene is doped with sulfur, nitrogen, oxygen, phosphorous or boron.

4. The bifunctional catalyst according to claim 1, wherein the graphene is doped with sulfur.

5. A method for producing a bifunctional catalyst for catalyzing both an oxygen reduction reaction and an oxygen evolution reaction, the method comprising:
   (a) mixing graphitic oxide with a source of sulfur; and
   (b) heating the mixture to form graphene, wherein the graphene is doped with sulfur and wherein graphene is provided with thiol functional groups.

6. The method according to claim 5, wherein the source of sulfur is sodium thiosulfate.

7. The method according to claim 5, wherein the source of sulfur is thiourea.

8. The method according to claim 7, wherein graphene is further doped with nitrogen.

9. A bifunctional catalyst obtained by a method according to claim 5, wherein the bifunctional catalyst comprises a sulfur doped graphene backbone and thiol functional groups bonded thereto.

10. The bifunctional catalyst according to claim 9, wherein the graphene is further doped with nitrogen, oxygen, phosphorous or boron.

11. A cathode for use in an electrochemical device, the cathode comprising a catalyst according to claim 1.

12. A cathode for use in an electrochemical device, the cathode comprising a catalyst according to claim 4.

13. A cathode for use in an electrochemical device, the cathode comprising a catalyst according to claim 9.

14. A cathode for use in an electrochemical device, the cathode comprising a catalyst according to claim 10.

15. The cathode of claim 11, wherein the electrochemical device is a metal-air fuel cell or a metal-air battery.

16. The cathode of claim 12, wherein the electrochemical device is a metal-air fuel cell or a metal-air battery.

17. The cathode of claim 13, wherein the electrochemical device is a metal-air fuel cell or a metal-air battery.

18. The cathode of claim 14, wherein the electrochemical device is a metal-air fuel cell or a metal-air battery.

* * * * *